US011606849B2

(12) United States Patent
Chu et al.

(10) Patent No.: US 11,606,849 B2
(45) Date of Patent: Mar. 14, 2023

(54) ACTIVE SHUNT FILTERING

(71) Applicant: Texas Instruments Incorporated, Dallas, TX (US)

(72) Inventors: Yongbin Chu, Plano, TX (US); Yogesh Kumar Ramadass, San Jose, CA (US); Jeffrey Anthony Morroni, Parker, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/457,768

(22) Filed: Jun. 28, 2019

(65) Prior Publication Data

US 2020/0413575 A1 Dec. 31, 2020

(51) Int. Cl.
*H05B 45/36* (2020.01)
*H02M 1/44* (2007.01)
(Continued)

(52) U.S. Cl.
CPC .............. *H05B 45/36* (2020.01); *H02M 1/44* (2013.01); *H02M 3/1582* (2013.01); *H05B 45/10* (2020.01); *H05B 45/3725* (2020.01)

(58) Field of Classification Search
CPC ...... H02J 3/00; H02J 3/38; H02J 3/383; H02J 3/386; H02M 3/335; H02M 1/32;
(Continued)

(56) References Cited

U.S. PATENT DOCUMENTS

| 7,405,528 B2 * | 7/2008 | Ho ......................... H02M 1/44<br>318/400.25 |
| 7,944,326 B2 * | 5/2011 | Tucker .................... H02M 1/12<br>333/181 |

(Continued)

FOREIGN PATENT DOCUMENTS

| CN | 104993470 A | * | 10/2015 | |
| CN | 105764181 A | * | 7/2016 | ......... H05B 33/0809 |

OTHER PUBLICATIONS

L. Wang, B. Zhang, D. Qiu and L. Wang, "A novel flicker-free AC-DC LED driver without electrolytic capacitor," Mar. 22, 2017, 2017 IEEE International Conference on Industrial Technology (ICIT), 2017, pp. 370-375. (Year: 2017).*

(Continued)

*Primary Examiner* — Rexford N Barnie
*Assistant Examiner* — David A Shiao
(74) *Attorney, Agent, or Firm* — Ray A. King; Frank D. Cimino

(57) ABSTRACT

In described examples, a system (e.g., a light-emitting diode dimmer system) includes a switching device coupled to a switching controller. The switching controller generates a control signal, which includes a low frequency signal (e.g., for controlling a dimming function) and a switching signal. An active electromagnetic interference filter (AEF) is coupled to the DC source. An active shunt is coupled to a power input node of the switching device and is configured to selectively couple a shunt current to the power input node of the switching device in synchronization with the low (Continued)

frequency signal (e.g., which can reduce, if not also eliminate, a saturation time of the AEF and improve the performance of the AEF).

16 Claims, 5 Drawing Sheets

(51) Int. Cl.
  *H02M 3/158* (2006.01)
  *H05B 45/10* (2020.01)
  *H05B 45/3725* (2020.01)

(58) Field of Classification Search
  CPC .......... H02M 1/36; H02M 1/12; H05B 37/00; H05B 37/02; H03H 7/00
  USPC ...... 307/91, 93, 64, 66, 82, 75, 68; 315/307, 315/320, 301, 309, 308, 188; 363/21.18, 363/21.01, 16; 318/181, 448; 333/181, 333/167
  See application file for complete search history.

(56) References Cited

U.S. PATENT DOCUMENTS

| | | | | |
|---|---|---|---|---|
| 10,050,535 B2* | 8/2018 | Hari | .................. | H02M 3/33507 |
| 2011/0227489 A1* | 9/2011 | Huynh | .................. | H05B 45/30 |
| | | | | 315/185 R |
| 2012/0081015 A1* | 4/2012 | Shimomura | ........... | H05B 45/00 |
| | | | | 315/188 |
| 2012/0112656 A1* | 5/2012 | Ryu | ..................... | H05B 45/395 |
| | | | | 315/291 |
| 2013/0193879 A1* | 8/2013 | Sadwick | ............ | H05B 45/3725 |
| | | | | 315/307 |
| 2014/0111110 A1* | 4/2014 | Qi | .......................... | H05B 45/38 |
| | | | | 315/210 |
| 2014/0368128 A1* | 12/2014 | Elferich | .................. | H05B 47/10 |
| | | | | 315/297 |
| 2015/0180325 A1* | 6/2015 | Liang | ................. | H02M 3/33546 |
| | | | | 363/21.09 |
| 2015/0214736 A1* | 7/2015 | Kung | ..................... | H05B 47/20 |
| | | | | 307/23 |
| 2016/0057825 A1* | 2/2016 | Hu | .......................... | H05B 45/12 |
| | | | | 315/201 |
| 2017/0179815 A1* | 6/2017 | Huang | ..................... | H02M 7/06 |
| 2017/0279376 A1* | 9/2017 | Siri | .......................... | H02M 1/08 |
| 2018/0026550 A1* | 1/2018 | Dent | ....................... | H02J 3/381 |
| | | | | 363/56.01 |
| 2018/0219473 A1* | 8/2018 | Ogino | .................... | H02M 3/158 |
| 2018/0294714 A1 | 10/2018 | Chu et al. | | |
| 2018/0295758 A1* | 10/2018 | Chu | ........................ | H02M 1/44 |
| 2019/0098723 A1* | 3/2019 | Sadwick | ................. | F21K 9/272 |
| 2019/0182917 A1* | 6/2019 | Abdalaal | ............ | H05B 45/3725 |
| 2019/0191506 A1* | 6/2019 | Huang | ................. | H05B 45/355 |
| 2020/0105185 A1* | 4/2020 | Chen | ....................... | H02M 1/32 |

OTHER PUBLICATIONS

S. Wang, X. Ruan, K. Yao, S. -C. Tan, Y. Yang and Z. Ye, "A Flicker-Free Electrolytic Capacitor-Less AC-DC LED Driver," Dec. 16, 2011, in IEEE Transactions on Power Electronics, vol. 27, No. 11, pp. 4540-4548, Nov. 2012. (Year: 2011).*

Z. Shan, X. Chen, J. Jatskevich and C. K. Tse, "AC-DC LED Driver With an Additional Active Rectifier and a Unidirectional Auxiliary Circuit for AC Power Ripple Isolation,", Mar. 5, 2018, in IEEE Transactions on Power Electronics, vol. 34, No. 1, pp. 685-699, Jan. 2019. (Year: 2018).*

L. Wang, B. Zhang and D. Qiu, "A Novel Valley-Fill Single-Stage Boost-Forward Converter With Optimized Performance in Universal-Line Range for Dimmable LED Lighting," Dec. 6, 2016, in IEEE Transactions on Industrial Electronics, vol. 64, No. 4, pp. 2770-2778, Apr. 2017. (Year: 2016).*

* cited by examiner

ACTIVE SHUNT FILTERING

BACKGROUND

Electronic systems include active components that selectively switch electrical current and/or voltage. For example, the components can be transistors, which can be formed as integrated circuits (e.g., dies) that generate electrical noise (e.g., switching noise) during operation. The electrical noise can include frequencies (and multiples thereof) of the frequencies at which the transistors are switched. Such noise can be reduced (e.g., filtered) by filter circuits. The filter circuits can include components (e.g., which can include inductors and capacitors) that are reactively coupled to the current and/or voltages being switched by the switching transistors. The amounts of current and/or voltage switched by switching transistors in some power supply applications can require large filtering components to increase the efficacy of the filtering for reducing the switching noise, which can significantly increase the size, volume, cost and weight of the system.

SUMMARY

In described examples, a system (e.g., a light-emitting diode dimmer system) includes a switching device coupled to a switching controller. The switching controller generates a control signal, which includes a low frequency signal (e.g., for controlling a dimming function) and a switching signal. An active electromagnetic interference filter (AEF) is coupled to the DC source. An active shunt is coupled to a power input node of the switching device and is configured to selectively couple a shunt current to the power input node of the switching device in synchronization with the low frequency signal (e.g., which can reduce, if not also eliminate, a saturation time of the AEF and improve the performance of the AEF).

DETAILED DESCRIPTION

Figure 1:
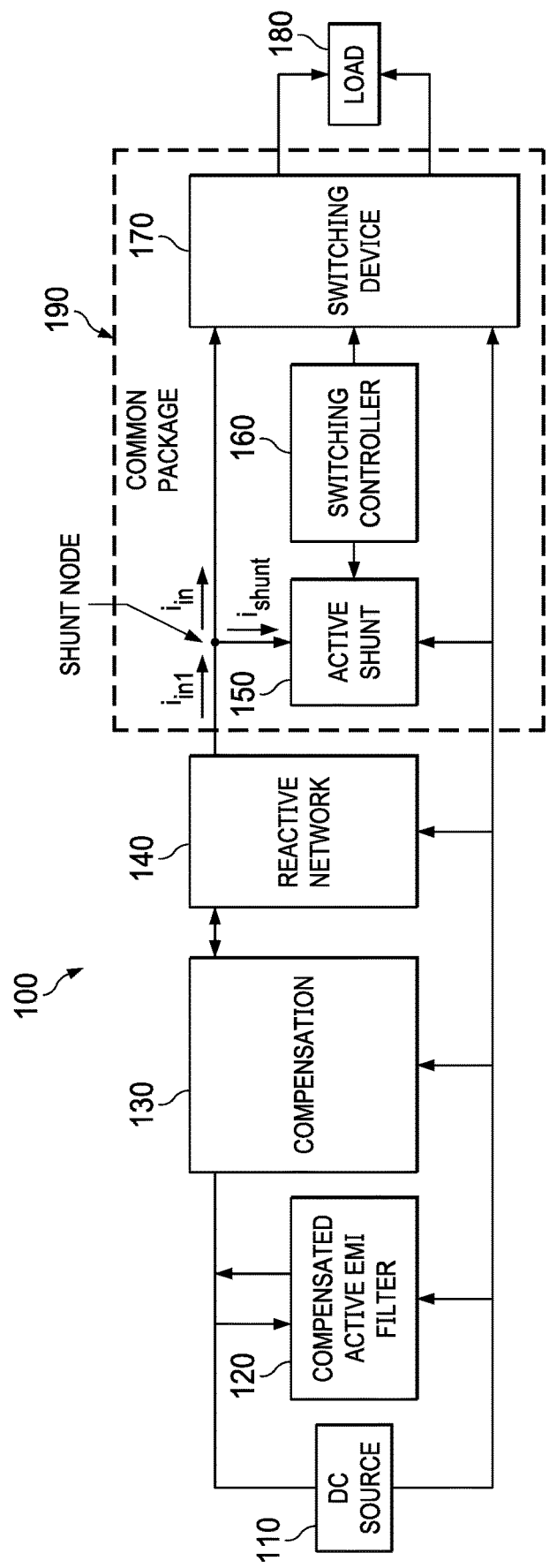
FIG. 1 is a block diagram of an example power system that includes an active shunt for reducing current transients.

In the drawings, like reference numerals refer to like elements, and the various features are not necessarily drawn to scale.

Filtering circuits can be used for reducing electrical noise (e.g., electromagnetic interference, or "EMI") generated by switching circuits. The filtering circuits can be active circuits that include reactive components, such as inductors and capacitors. Some such filtering circuits can be arranged as active EMI filters (AEFs). The active EMI filters can include amplifiers to increase the efficacy of filtering that can be provided by using relatively small filtering components. Active EMI filtering devices are described in commonly assigned U.S. patent application Ser. No. 15/715,975 and Ser. No. 15/715,708 filed Sep. 26, 2017, respectively entitled "Compensated Active Electro-Magnetic Interference Filters," and "Cascaded Active Electro-Magnetic Interference Filter" by Yongbin Chu, et al., which are incorporated herein by reference in their entireties.

Active EMI filters (AEFs) active circuitry allows smaller inductors and capacitors to be used to reduce EMI noise. As a result, the use of AEFs can reduce the size, volume, cost and/or weight of EMI filters that could otherwise result from the use of larger passive (e.g., solely passive) EMI filters.

The active circuitry of AEFs includes an amplifier, such as an operation amplifier (op amp). An operational amplifier in an AEF can be configured as a high-gain amplifier. The large gain of the large-gain amplifier can be used to amplify sensed noise (e.g., for use in canceling the EMI noise). However, an amplifier in a saturated state can lose the ability to actively filter various frequency disturbances, which limits the target usages for which including AEF is suitable.

The susceptibility of the operational amplifier to enter (and remain in) a saturated state during transient or low frequency dimming events (e.g., events that occur in LED PWM dimming systems) can be increased in various operating conditions. For example, such operating conditions can include: configuring the operation amplifier as a high-gain operational amplifier; switching of high amounts of currents and/or high voltages; and the operational amplifier sensing relatively high voltages.

Some LED lighting systems having PWM dimming functions include control signals such as a dimming signal and a switching signal. The dimming signal is toggled at low frequencies for switching the LEDs on and off, which controls the emitted intensity of the LED light and is usually at a frequency greater than the human eye can perceive. The switching signal is toggled at high frequencies, which generates switching noise. When the dimming signal is low, the switching signal remains off (e.g., so that the LEDs are off). When the dimming signal is high, the switching signal is activated, so that the switches are toggled on and off to control the forward current through the LEDs and/or the forward voltage asserted across the LEDs, (e.g., so that the LEDs are on). AEFs are configured to actively filter noise (e.g., reduce noise) generated by the switching device. However, the low frequency dimming induces large transient currents at the dimming frequencies, which induces (e.g., in response to circuit impedances) large transient voltages that can be sensed (e.g., detected) by an AEF. In such dimming systems, the operational amplifier of the AEF can be driven into saturation (e.g., so that the AEF cannot freely respond to the sensed switching noise because of being in a saturated state). The AEF can be driven into the saturated state by high slew rates and large magnitudes of low frequency dimming currents generated by some LED PWM dimming systems, as described hereinbelow.

While in a saturated state, the AEF cannot amplify the sensed switching noise to generate a noise cancelation signal. Also, while in the saturated state, the AEF injects broadband EMI noise into the power line (e.g., so that the injection of AEF-generated noise can potentially aggravate the noise intrusion condition that the AEF is otherwise intended to reduce).

In example circuits (e.g., switching circuits) and methods described hereinbelow, an active shunt circuit (e.g., active shunt) can be arranged to selectively shunt current from a node (e.g., a power node of a power line). For example, the active shunt can be arranged to source (e.g., inject) or sink (e.g., drain) current into and from the node. (The term "shunt" can include injecting current into a node and/or draining current from the node.) Selectively (e.g., selectively in response to a dimming signal for controlling at least one switching transistor) shunting current can reduce the slew rates (e.g., rates of change) of the low frequency transients (e.g., rising and falling edges) of the current flowing into the active shunt and the switching device. The sum of the current flowing into the active shunt and the current flowing into the switching device includes a low frequency current, where the low frequency current flowing into the switching device can be generated in response to the low frequency dimming signal.

In response to the reduction of the slew rates of the low frequency current transients, the slew rates of the line voltage transients are also reduced. Reducing the slew rates of the line voltage fluctuations that occur during dimming transient events helps inhibit the AEF from entering a saturated state, so that the AEF can maintain active filtering for reducing EMI noise that is present at switching frequencies and/or multiple of switching frequencies.

FIG. 1 is a block diagram of an example power system that includes an active shunt for reducing current transients. The power system 100 is an example power system that includes a DC power source 110, a compensated active EMI filter (AEF 120), compensation 130, a reactive network 140, an active shunt 150, a switching controller 160, a switching device 170, and a load 180. In at least one example power system, a circuit includes: a switching controller having a first output (e.g., a switching device control output) and a second output (e.g., a shunt control output), where the switching controller is configured to generate a first signal (e.g., a switching device control signal) at the first output (e.g., the switching device control output), and the switching controller is configured to generate a second signal (e.g., a shunt control signal) at the second output (e.g., the shunt control output); a switching device having a first input (e.g., a power input), a third output (e.g., a power output) and a second input (e.g., a switching device control input), where the first input (e.g., the power input) is adapted to be coupled to a direct current (DC) source, the third output (e.g., the power output) is adapted to be coupled to a load, the second input (e.g., the switching device control input) is coupled to the first output (e.g., the switching device control output), and the switching device is configured to switch, responsive to the first signal (e.g., the switching device control signal), a load current adapted to drive the load coupled to the third output (e.g., the power output); and an active shunt having a shunt node and a third input (e.g., a shunt control input), where the shunt node is coupled to the first input (e.g., the power input), the third input (e.g., the shunt control input) is coupled to the second output (e.g., the shunt control output), and the active shunt is configured to selectively generate a shunt current coupled through the shunt node responsive to the second signal (e.g., the shunt control signal).

The switching device 170 can be a switching device such as a single-ended primary inductive converter (SEPIC). The SEPIC can be used in LED-based dimming systems, as described hereinbelow. The switching device 170 is arranged to generate modulated output power by switching on and off (e.g., actuating) transistors of the switching device 170. In an example configuration, the switching device 170 is configured to generate the modulated output power responsive to a control signal (e.g., a first signal) that can include a first frequency signal and a second frequency signal whose operational frequency is lower than an operational frequency of the first frequency signal. In one example, the switching device 170 is configured to generate a first power level (e.g., for generating a maximum level of brightness) in response to the first frequency signal when the second frequency signal is always high (e.g., 100 percent duty cycle). When the second frequency signal is not always high, the switching device 170 is configured to generate different output power levels responsive to the second frequency signal (e.g., proportional to the active duty cycle of the second frequency signal, where the active duty cycle is the percentage that the second frequency signal is high) to control the output power into the load 180 (e.g., so that the brightness of the LEDs of the load 180 can be controlled). The second frequency signal can be generated responsive to a user control input.

The switching controller 160 is arranged to generate the control signal (e.g., the first signal). The control signal includes a first frequency signal adapted to actuate the transistors in the switching device 170 to control the output power (e.g., output voltage and/or output current), and includes a second frequency signal adapted for controlling the percentage that the output power is on (e.g., controlling the average forward voltage across and/or the average forward current through the LEDs of the load 180). The first frequency signal (e.g., of the first signal) is a high frequency signal, which is asserted at high frequencies (e.g., where the high frequencies are frequencies that are higher than pulse repetition frequency of the second frequency signal) and generates high frequency switching noise. The second frequency signal (e.g., of the first signal) can be a dimming control signal, which is asserted at lower frequencies and is arranged to cycle the LEDs of the load 180 on and off, so that the apparent intensity of light emitted by at least one LED (e.g., of the load 180) is controlled in response to the dimming control signal. In response to the dimming control signal being asserted low (e.g., being deasserted), the transistor switches of the switching device 170 are turned off (and remain off). In response to the dimming control signal being asserted high, the first frequency signal is arranged to actuate the transistor switches of the switching device 170. When the dimming control signal is high, actuating the transistors can generate constant (e.g., relatively constant) forward current through the LEDs and/or constant (e.g., relatively constant) forward voltage across the LEDs of the load 180 (e.g., not considering the effects of switching ripples). As described hereinbelow, the active shunt 150 is configured to switch the shunt current responsive to (e.g., or in synchronization with) the second (e.g., low) frequency signal (e.g., so that the slew rates of the low frequency current drawn from the reactive network 140 can be reduced by the active shunt 150, where the current flowing through the reactive network 140 equals the sum of the active shunt current and the switching device input current, whose low frequency component corresponds to the second frequency signal). In an example, the active shunt 150 is configured to selectively couple the shunt current to the power input (e.g., the first input) of the switching device responsive to the second frequency signal (e.g., of the first signal). In another example, the active shunt 150 is configured to switch the shunt current in synchronization with the second frequency signal (e.g., the active shunt 150 can be switched at times around the transitions of the second frequency signal from low to high or from high to low).

In an example, the switching frequency of the switching signal (e.g., the first frequency signal) is higher than the dimming frequency of the dimming signal (e.g., the second frequency signal). The dimming signal in the example can have a frequency of 1 kHz and a 50 percent duty cycle. The switching signal example can have a frequency of 400 kHz and a 50 percent duty cycle. The high frequency switching of the transistors of the switching device 170 induces switching noise that is coupled through the reactive network 140 to a first power terminal (e.g., positive power terminal) of the DC power source 110.

The AEF 120 is an active electromagnetic interference filter that is coupled to the DC power source 110. The AEF 120 is arranged to actively filter (e.g., reduce) the switching noise generated by the switching device 170, which generates the switching noise as a response of generating the modulated output power.

The active shunt 150 is coupled to the power input node of the switching device 170. The active shunt 150 in an example is configured to selectively couple a shunt current to the power input node of the switching device 170 in synchronization with the low frequency dimming control signal (e.g., the second frequency signal). The active shunt 150 is arranged to selectively couple the shunt current to the power input node of the switching device 170 in response to the low frequency dimming control signal (e.g., the second frequency signal). The shunt current reduces (e.g., eliminates) the length of time an amplifier of the AEF 120 is in a saturated state, as described hereinbelow.

In some examples, the active shunt 150, the switching controller 160 and the switching device 170 can be included in a common package 190. The common package 190 can be an integrated circuit, such as a power supply module package. The common package can include terminals (e.g., pins) for coupling to external components, such as the load 180 and/or the reactive network 140.

The power system 100 includes enhanced AEF noise filtering performance and high system power densities without AEF 120 saturation over a range of uses. Accordingly, the power system 100 is economically suited for use in a range of products.

Figure 2:
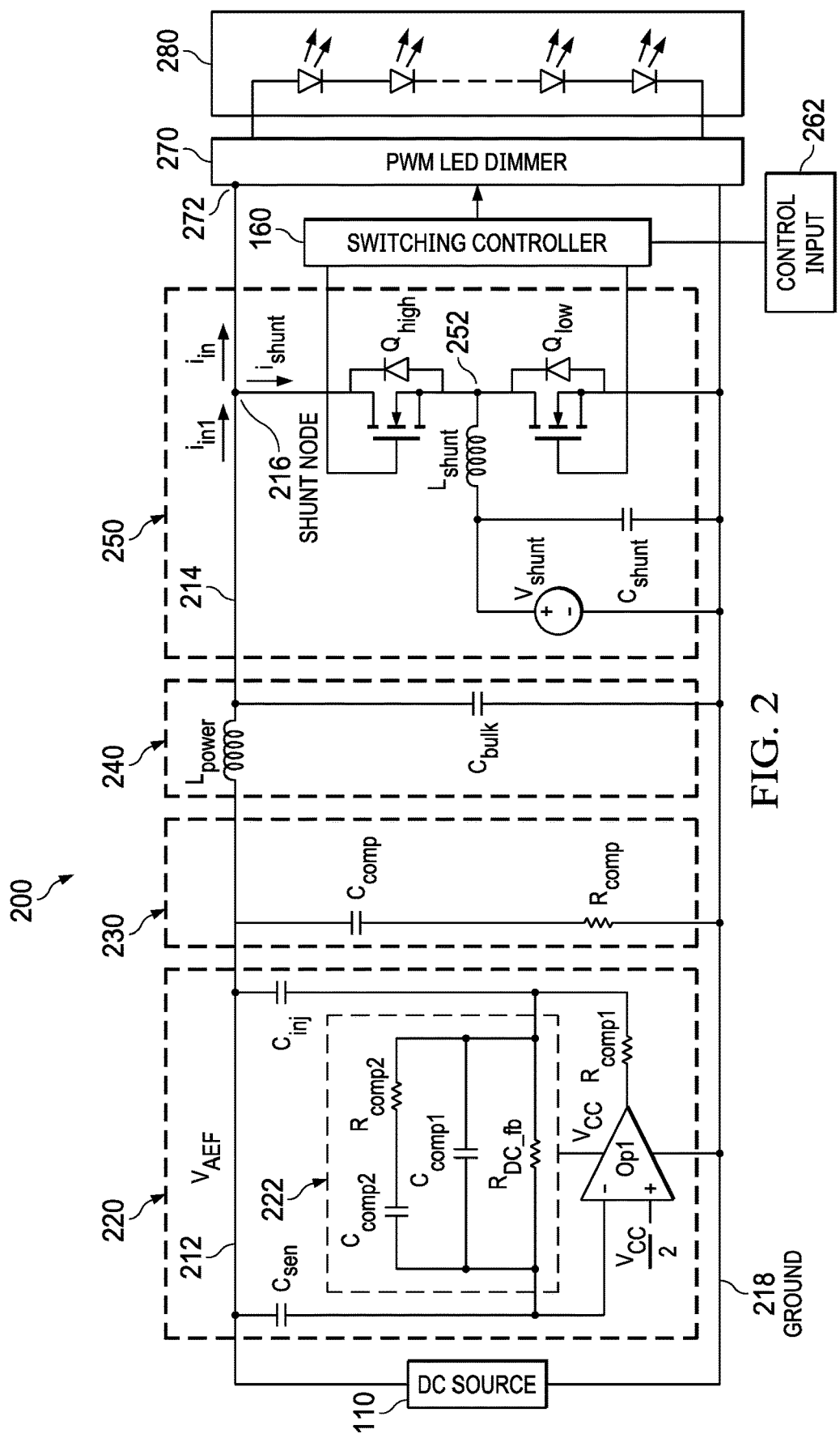
FIG. 2 is a block diagram of an example power system that includes an active shunt for reducing current transients in a light-emitting diode (LED) pulse-width modulated (PWM) dimmer.

FIG. 2 is a block diagram of an example power system that includes an active shunt for reducing current transients in a light-emitting diode dimmer. The power system 200 is an example power system that includes a DC power source 110, a compensated active EMI filter (AEF 220), compensation 230, a reactive network 240, an active shunt 250, a switching controller 160, a switching device such as PWM LED dimmer 270, and LEDs 280 (e.g., that are adapted to be coupled as a load).

In various examples, the DC source 110 of the power system 200 can be a battery, a fuel cell, a photovoltaic cell, a DC power supply, or other source of DC power. The power can be switched by a switching device, such as the switching device 170 and/or the PWM LED dimmer 270.

In various examples, the PWM LED dimmer 270 is arranged to modulate power supplied from the DC source 110 by actuating the transistor switches in the PWM LED dimmer 270. The output of the PWM LED dimmer 270 (e.g., switching device 170) can be modulated power, voltage and/or current applied to a load 180, such as the LEDs 280. The apparent brightness of the LEDs 280 can be controlled by a user manipulating a control input 262 (e.g., a slider switch) that is coupled to the switching controller 160.

The switching controller 160 is arranged to modulate the control signal in response to a control input 262, such as a user control. The switching controller 160 is arranged to generate a control signal, which includes a dimming (e.g., low frequency) signal (e.g., which can include a PWM pulse repeated at a pulse-repetition frequency, $f_{dim}$) and a switching (e.g., high frequency) signal (which can include a PWM pulse repeated at a pulse-repetition frequency, $f_{sw}$, that is higher than the frequency of the dimming signal, $f_{dim}$). The low frequency signal and the high frequency signal can be applied to (e.g., asserted) at least one input of the PWM LED dimmer 270. For example, the dimming signal and the switching signal can be logically combined (e.g., multiplexed) into a single signal for controlling the switches (e.g., power transistors) of the PWM LED dimmer 270.

When the dimming signal is asserted low, the switches in the PWM LED dimmer 270 remain off, so that (for example) the LEDs 280 are off. In response to the dimming signal being asserted high, the switch control signal actuates the switches of the PWM LED dimmer 270 to couple output power (e.g. forward voltages and/or forward currents) to drive the LEDs 280 (e.g., so that the LEDs 280 are on in response to the dimming signal being asserted high).

In an example where the switching frequency $f_{sw}$ is higher than the dimming frequency $f_{dim}$, the power applied at the dimming frequency $f_{dim}$, strobes the LEDs 280 at a frequency that human eyes cannot readily detect, such as at a frequency between 200 Hz to 1 kHz. By varying the duty cycle of the dimming signal (e.g., varying the percentage of time when the dimming signal is high), the average forward current (or forward voltage and/or power) applied to the LEDs can be controlled (e.g., so that the degree of brightness of the LEDs 280 can be controlled). Because the switching frequency $f_{sw}$ is a relatively high frequency (e.g., within or close to a frequency range of industry standards for EMI), the noise generated in response to the switching signal (e.g., when the dimming signal is high) can introduce EMI noise that exceed permissible noise levels (e.g., noise levels of the relevant industry standards).

The high frequency switching of the PWM LED dimmer 270 generates electrical noise: on the input power line 214 (e.g., a first power rail) of the PWM LED dimmer 270; the sensing and injection nodes of the AEF 220 ($V_{AEF}$ 212, which is coupled to the output of the DC source 110); and the ground 218 (e.g., which is a second power rail of the PWM LED dimmer 270 for coupling return currents to the DC power source 110). The noise generated by the PWM LED dimmer 270 can propagate to other systems and devices powered by the DC power source 110 (e.g., other devices coupled to the input power line 212 and/or ground 218).

The PWM LED dimmer 270 is coupled to the DC power source 110 via a reactive network (which can include reactive energy storage devices), such as the reactive network 140 and/or the reactive network 240. The reactive network 240 is coupled between a terminal of the DC source 110 and the power input node 272 of the PWM LED dimmer 270 (and/or the switching device 170). In an example, the reactive network 240 includes an inductor (e.g., $L_{power}$) having a first inductor terminal (coupled to the DC source) and having a second inductor terminal. The PWM LED dimmer 270 is a switching device having a control input and having a power input node 272 coupled to the second inductor terminal, where the switching device is arranged to selectively switch a first current coupled through the power input node 272. The power input node 272 of the PWM dimmer 270 is coupled to receive power from both the DC source 110 (e.g., via $L_{power}$) and a capacitor (e.g., $C_{bulk}$). The capacitor has a first capacitor terminal (coupled to the second inductor terminal) and has a second capacitor terminal coupled to ground. In some examples, the capacitor $C_{bulk}$ can have a value of at least 20 microfarads, which can be electrolytic capacitors coupled in parallel with ceramic capacitors. In an example, the first inductor terminal is a first terminal of a reactive network and the second inductor terminal is a second terminal of the reactive network. In one example, the first terminal of the reactive network is coupled to the injection node (e.g., the terminal of the injection capacitor, $C_{inj}$, that connected to the input power line 212), and the second terminal of the reactive network is coupled to the power input node 272.

The AEF 220 is coupled between the input power line 212 and the ground 218. In various examples, the AEF 220 is an AEF (e.g., AEF 120) that is a voltage sensing and current compensation filter arranged to sense (e.g., detect) a switching noise voltage $V_{AEF}$ induced on the input power line 212 (e.g., induced on a first power rail of the system).

The AEF 220 has sensing and injection nodes coupled to the input power line 212 (e.g., the DC source). In an example, the inverting input of the amplifier Op1 of the AEF 220 is AC-coupled (e.g., alternating current- and/or capacitively-coupled) via a sensing capacitor $C_{sen}$ to the sensing node (e.g., that is coupled to the input power line 212). The amplifier Op1 is configured to generate a cancellation signal in response to the sensed noise voltage (e.g., where the sensed noise voltage is capacitively coupled to the inverting input of the amplifier Op1 via the sensing capacitor $C_{sen}$), and the amplifier Op1 is configured to drive a cancellation signal (e.g., a current) onto the input power line 212 via a first compensation resistor ($R_{comp1}$) and an injection capacitor $C_{inj}$. The injection capacitor $C_{inj}$ capacitively couples the cancellation signal to the injection node, which couples to the input power line 212, so that the amplitude of the noise voltage on the input power line 212 is reduced. In an example, the AEF 220 has an injection node coupled to the shunt node and is adapted to be coupled to the DC source. In the example, the injection node can be coupled to the shunt node through the inductor $L_{power}$.

The non-inverting input of the amplifier Op1 is coupled to a reference voltage (e.g., $V_{CC}/2$), which can be a voltage level that is halfway between ground and a power supply voltage for powering the amplifier Op1. The reference voltage determines the DC operation point of the amplifier Op1, so the amplifier Op1 can operate over its full operating range when the reference voltage is halfway between ground and the power supply voltage for the amplifier Op1.

The amplifier Op1 includes feedback circuitry 222, which includes three branches in which each branch couples an output of the amplifier Op1 to the inverting input of the amplifier Op1. A first feedback branch is a resistive direct current feedback path that includes a resistor (e.g., $R_{DC\_fb}$). A second feedback branch is a capacitive feedback path that includes a first frequency compensation capacitor (e.g., $C_{comp1}$). A third feedback branch is a resistive/capacitive feedback path that includes a second frequency compensation capacitor (e.g., $C_{comp2}$) and a second frequency compensation resistor (e.g., $R_{comp2}$). The first feedback branch controls the DC gain of the amplifier Op1, and the second and the third feedback branches provide frequency compensation for enhancing the stability of the AEF 220 at low frequency.

In various examples, a high frequency compensation network 230 is coupled in parallel with AEF 220, (e.g., so that the high frequency compensation network 230 is coupled between the input power line 212 and the ground 218). The high frequency compensation network 230 can improve the high frequency phase margin of the AEF 220, which helps improve the stability of the AEF 220 at high frequencies.

To reduce (e.g., eliminate) a time in which the AEF 220 is in a saturated state, the active shunt 250 is arranged to selectively couple a shunt current, $i_{shunt}$, to the shunt node 216 to reduce a slew rate of a current $i_{in1}$ of the power line 214. The active shunt 250 is arranged to reduce the slew rates of the rising and falling edges of the current $i_{in1}$ while the current $i_{in}$ includes high slew rates generated in response to the low frequency signal (e.g., the dimming control signal). In an example, the dimmer input current is the current $i_{in}$ coupled to flow between the shunt node 216 and the power input node 272, and the active shunt 252 is configured to reduce the slew rates of the low frequency transitions of the current $i_{in1}$.

In some examples, the rising and falling edges of the low frequency dimming current are synchronized with (e.g., generated in response to) a 50 percent duty cycle clock. In other examples, the rising and falling edges of the low frequency dimming current are respectively synchronized with first and second edges of a PWM pulse. In the description and waveforms described hereinbelow, a 50 percent dimming duty cycle is shown (although other duty cycles are possible, as described herein).

The active shunt 250 is arranged to selectively couple a shunt current from the shunt node 216 in synchronization with (e.g., or in response to) a dimming signal coupled to the PWM LED dimmer 270. The active shunt 250 is arranged to selectively couple the shunt current to the shunt node 216 to reduce a slew rate of the current $i_{in1}$ coupled through the reactive network 240 (e.g., described hereinbelow with reference to FIG. 3 and FIG. 4).

According to Kirchhoff's current law, the shunt current $i_{shunt}$ is equal to the current $i_{in1}$ (supplied from the reactive network 240) minus the current $i_{in}$ (drawn through the power input node 272 of the PWM LED dimmer 270), so that: $i_{shunt}=i_{in1}-i_{in}$. Accordingly, the current $i_{in1}$ drawn from the reactive network 240 is a sum of the shunt current $i_{shunt}$ and the current $i_{in}$ (drawn through the power input node 272). The current $i_{in}$ is determined in response to the load 280, the PWM LED dimmer 270 and the switching controller 160 (e.g., where the current $i_{in}$ is determined in response to the dimming signal and the switching signal). By controlling the shunt current $i_{shunt}$, the current $i_{in1}$ with reduced low frequency dimming rising and falling edges can be achieved, which will reduce (e.g., eliminate) the saturation of the AEF amplifier Op1.

In various examples, the active shunt 250 includes NMOS (N-type metal-oxide semiconductor) transistors $Q_{high}$ and $Q_{low}$, which are coupled in series between the shunt node 216 and ground. The transistor $Q_{high}$ is arranged to selectively couple a shunt switching node 252 to a first power rail (e.g., the shunt node 216) and the transistor $Q_{low}$ is arranged to selectively couple the shunt switching node 252 to the second power rail (e.g., ground). In an example, the active shunt (e.g., 250) includes a first transistor (e.g., $Q_{high}$), a second transistor ($Q_{low}$), a first power rail (e.g., 214) and a second power rail (ground), where the first transistor is coupled in series with the second transistor between the first power rail and the second power rail to form a switching node (e.g., 252) between the first transistor and the second transistor, where the first transistor is configured to selectively couple the switching node to the first power rail, and where the second transistor is configured to selectively couple the switching node to the second power rail.

The active shunt 250 includes a shunt inductor ($L_{shunt}$) that has a first terminal coupled to the shunt switching node 252, which is between the series-coupled transistors $Q_{high}$ and $Q_{low}$. A second terminal of the $L_{shunt}$ is coupled to at least one of a high side (e.g., a first terminal) of the voltage source $V_{shunt}$ and/or is coupled to a high side (e.g., a first terminal) of the capacitor $C_{shunt}$. The low sides (e.g., respective second terminals) of the $V_{shunt}$ and the $C_{shunt}$ are coupled to ground. In an example, the active shunt (e.g., 250) includes an inductor (e.g., $L_{shunt}$) having a first terminal coupled to the switching node (e.g., 252) and having a second terminal coupled to at least one of a voltage source (e.g., $V_{shunt}$) and a capacitor (e.g., $C_{shunt}$).

In operation, the series-coupled transistors $Q_{high}$ and $Q_{low}$ can be independently switched on and off (e.g., actuated or controlled) in response to the shunt control signal (e.g., the second signal), so that the current $i_{in1}$ can be controlled (e.g., so that the slew rate of the current $i_{in1}$ can be reduced). In an example, the shunt current $i_{shunt}$ flows in a first direction through the transistor $Q_{high}$ when the controlled current $i_{in1}$ is larger than the current $i_{in}$. When the controlled current $i_{in1}$ is smaller than the current $i_{in}$, the shunt current $i_{shunt}$ flows in a second direction (that is opposite and negative with respect to the first direction) through the transistor $Q_{high}$. In an example: the first transistor, the second transistor, the inductor and the at least one of the voltage source and the capacitor are configured as a buck converter in response to the shunt current being a positive current; and the first transistor, the second transistor, the inductor and the at least one of the voltage source and the capacitor are configured as a boost converter in response to the shunt current being a negative current.

When $i_{shunt}$ is generated by the active shunt 250 as a positive current (e.g., flowing in the first example direction), the shunt current $i_{shunt}$ flows from the power line 214 (e.g., a positive power line, which includes the shunt node 216) towards ground (e.g., a negative power line). When $i_{shunt}$ current is a positive current, the transistors $Q_{high}$ and $Q_{low}$ are controlled (e.g., selectively actuated) to couple (e.g., to configure) components (e.g., $L_{shunt}$ and/or $C_{shunt}$) and/or the voltage source $V_{shunt}$ of the active shunt 250 as a buck converter. When the active shunt 250 is configured as a buck converter, $Q_{high}$ is repeatedly toggled (e.g., switched on and off) to generate the positive $i_{shunt}$ current, while $Q_{low}$ can remain (e.g., during the time in which the transistor $Q_{high}$ is being repeatedly switched on and off) in an off state. The length of the time that the shunt current $i_{shunt}$ is positive determines the length of the time in which the active shunt 250 is configured as a buck converter. The positive values of the shunt current $i_{shunt}$ control the length of the time in which the transistor $Q_{high}$ is in the on state (e.g., which determines in part the duty cycle of $Q_{high}$). In some examples, the switching frequency of the transistor $Q_{high}$ can be higher than the switching frequency of the PWM LED dimmer 270.

The transistor $Q_{low}$ includes a low-side parallel diode (e.g., paralleled diode) coupled between the source and drain of $Q_{low}$. The parallel diode can be a parasitic diode (e.g., body diode) of $Q_{low}$ and/or an external diode (e.g., a diode coupled external to the body of $Q_{low}$). A low-side freewheeling current (e.g., current sourced from ground) can flow through the $Q_{low}$ parallel diode while the active shunt 250 is configured as a buck converter (e.g., when the $i_{shunt}$ current is a positive current). In some systems, the transistor $Q_{low}$ can also be synchronously driven with a gate control signal that is the complement of the $Q_{high}$ gate control signal.

When $i_{shunt}$ is generated by the active shunt 250 as a negative current (e.g., flowing in the second example direction), the shunt current $i_{shunt}$ flows from the negative power line (e.g., ground) towards the positive power line. When $i_{shunt}$ is a negative current, the transistors $Q_{high}$ and $Q_{low}$ are controlled (e.g., selectively actuated) to couple (e.g., to configure) components (e.g., $L_{shunt}$ and $C_{shunt}$) and/or the voltage source $V_{shunt}$ of the active shunt 250 as a boost converter. When the active shunt 250 is configured as a boost converter, $Q_{low}$ is repeatedly switched on and off to generate the negative $i_{shunt}$ current, while $Q_{high}$ can remain (e.g., during the time in which the transistor $Q_{low}$ is repeatedly switched on and off) in an off state. The length of the time that the shunt current $i_{shunt}$ is negative controls the length of the time in which the active shunt 250 is configured as a boost converter. The negative values of the shunt current $i_{shunt}$ control the length of the time in which the transistor $Q_{low}$ is in the on state (e.g., which determines in part the duty cycle of $Q_{low}$). The switching frequency of the transistor $Q_{low}$ can be higher than the switching frequency of the PWM LED dimmer 270. (The switching frequency of the transistor $Q_{low}$ can also be the same as the switching frequency of the transistor $Q_{high}$ while operating in the buck converter configuration, described hereinabove.)

The transistor $Q_{high}$ includes a high-side parallel diode (e.g., paralleled diode) coupled between the source and drain of $Q_{high}$. The parallel diode can be a parasitic diode (e.g., body diode) of $Q_{high}$ and/or an external diode (e.g., a diode coupled external to the body of $Q_{high}$). A high-side freewheeling current (e.g., current sourced from $L_{shunt}$) can flow through the $Q_{high}$ parallel diode while the active shunt 250 is configured as a boost converter (e.g., when the $i_{shunt}$ current is a negative current). In some systems, the transistor $Q_{high}$ can also be synchronously driven with a gate control signal that is the complement of the $Q_{low}$ gate control signal. In an example, the active shunt (e.g., 250) includes a first parallel diode and a second parallel diode, where the first parallel diode is coupled between a source and a drain of the first transistor, and where the second parallel diode is coupled between a source and a drain of the second transistor, so that a first freewheeling current flows through the second parallel diode in response to the shunt current being a positive current, and so that a second freewheeling current flows through the first parallel diode in response to the shunt current being a negative current. In some examples, a gate of the first transistor is coupled to the second output (e.g., the shunt control output) and a gate of the second transistor is coupled to a complement (e.g., a logical complement) of the second output (e.g., the shunt control output), so that the first transistor is responsive to the second signal (e.g., the shunt control signal) and so that the second transistor is responsive to a complement (e.g., logical inversion) of the second signal (e.g., the shunt control signal).

Example values of listed components of power system 200 can be as follows hereinbelow. In various examples, the DC source 110 can have an output voltage of 14 volts.

The AEF 220 example values of listed components include $C_{sen}$ (e.g., 50 nanofarads), $C_{comp2}$ (e.g., 500 picofarads), $R_{comp2}$ (e.g., 2 kiloohms), $C_{comp1}$ (e.g., 100 picofarads), $R_{DC\_fb}$ (e.g., 50 kiloohms), $R_{comp1}$ (e.g., 2 ohms) and $C_{inj}$ (e.g., 500 nanofarads).

The compensation 230 example values of listed components include $C_{comp}$ (e.g., 100 nanofarads) and $R_{comp}$ (e.g., 0.5 ohms).

The reactive network 240 example values of listed components include $L_{power}$ (e.g., 500 nanohenries) and $C_{bulk}$ (e.g., 1 microfarad through 50 microfarads). The inductor $L_{power}$ can include a value adapted to filter noise in conjunction with the active filtering of the AEF 220.

The active shunt 250 example values of listed components include $L_{shunt}$ (e.g., 500 nanohenries), $V_{shunt}$ (e.g., 8 volts) and $C_{shunt}$ (e.g., 10 microfarads).

An example described system includes: a direct current (DC) source; an inductor having a first inductor terminal and a second inductor terminal, the first inductor terminal coupled to the DC source; an active electromagnetic interference filter (AEF) having a sensing node and an injection node, the sensing node and the injection node coupled to the first inductor terminal; a switching device having a first input (e.g., a switching device power input) and a second input (e.g., a switching control input), the first input coupled to the second inductor terminal, wherein the switching device is arranged to selectively switch a first current (e.g., a current tin) coupled through the first input; a capacitor having a first capacitor terminal and a second capacitor terminal, the first capacitor terminal coupled to the second inductor terminal, and the second capacitor terminal coupled to ground; a switching controller having a first output (e.g., a switching control output) and a second output (e.g., a shunt control output), the first output (e.g., the switching control output) coupled to the second input (e.g., the switching control input), the switching controller configured to generate a first signal (e.g., a switching device control signal) at the first output (e.g., the switching control output), and the switching controller configured to generate a second signal (e.g., a shunt control signal) at the second output (e.g., the shunt control output); and an active shunt having a shunt node and a third input (e.g., a shunt control input), the shunt node coupled to the first input (e.g., the switching device power input) and the second inductor terminal, the third input coupled to the second output (e.g., the shunt control output); the active shunt configured to selectively generate a second current (e.g., a shunt current) coupled through the shunt node responsive to the second signal (e.g., the shunt control signal), wherein a third current coupled to the shunt node and drawn through the inductor and the capacitor is the sum of the first current and the second current.

In some examples of the system, the active shunt is configured to selectively generate the second current (e.g., the shunt current) in response to the second signal (e.g., the shunt control signal). In some examples, the system includes a load, the load coupled to receive power at the output of the switching devices, and the load can include at least one light-emitting diode (LED). In some examples, the active shunt is arranged to reduce the time in which the AEF is in a saturated state.

An example described system includes: generating, by a switching device, a modulated output power (e.g., output current) by switching the switching device responsive to the switching control signal; filtering, by an active electronic filter (AEF), noise generated by the switching device; and selectively coupling, by an active shunt, a shunt current to a first input (e.g., a switching device power input) node of the switching device responsive to the shunt control signal.

Some example methods further include: reducing, by the active shunt, a slew rate of a current coupled through a reactive network that is coupled between the first input (e.g., a switching device power input) node of the switching device and a power source adapted to supply power to the switching device. Some example methods further include: pulse-width modulating, by a switch controller, the shunt control signal in response to the switching control signal (e.g., in response to a low frequency dimming signal of the switching control signal).

Figure 3:
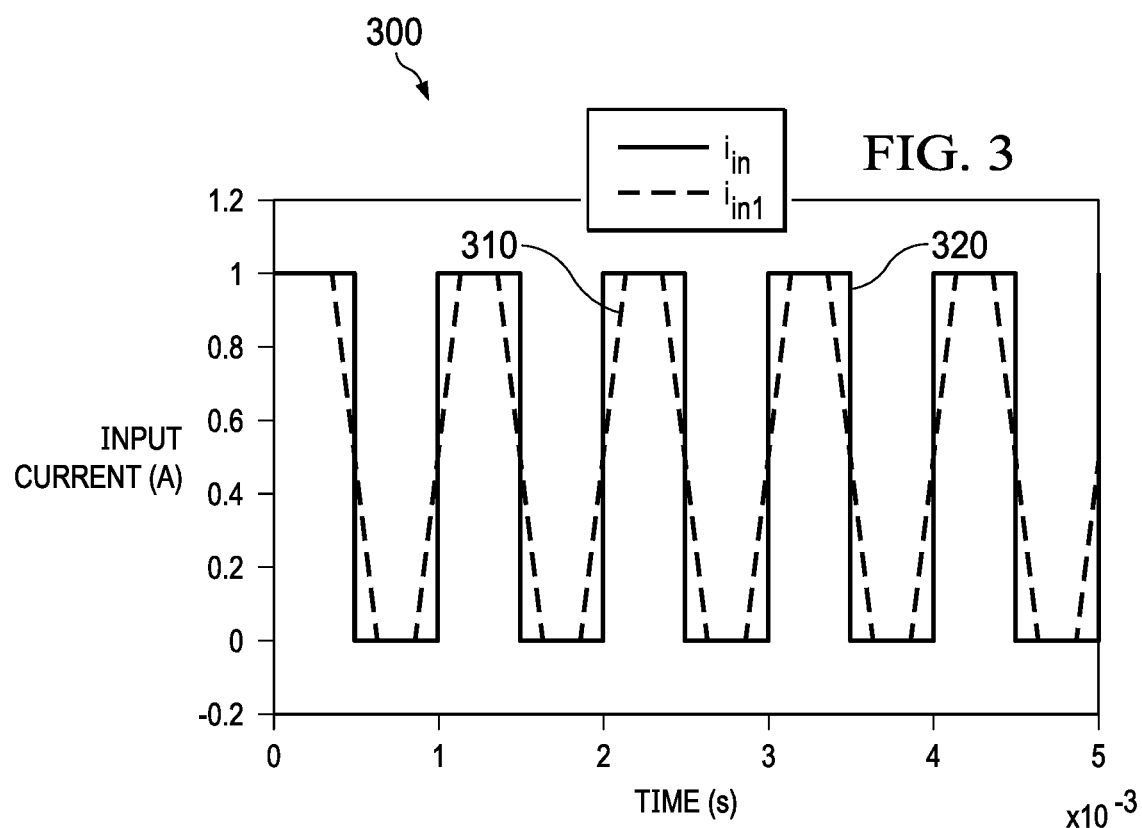
FIG. 3 is a waveform diagram of an example low frequency switching device current waveform and an example low frequency current waveform flowing into both the switching device and the active shunt path of an LED PWM dimmer operating in response to a dimming control.

FIG. 3 is a waveform diagram of an example reactive network current waveform $i_{in1}$ and an example switching device current waveform $i_{in}$. The waveform diagram 300 is an example waveform diagram that includes the controlled $i_{in1}$ waveform 310 (e.g., of a current supplied by a reactive network 240) and the $i_{in1}$ waveform 320 (e.g., of a current drawn by a switching device 170). (The waveform 310 and the waveform 320 are idealized, e.g., for clarity.) Without having the shunt current $i_{shunt}$ injected into the shunt node, the $i_{in1}$ waveform 310 and the $i_{in}$ waveform 320 would otherwise be equal. (An example waveform of the shunt current $i_{shunt}$ is described hereinbelow with reference to FIG. 4.) In FIG. 3, to enhance clarity (for example), the low frequency components generated in response to the dimming signal are shown in the waveforms 310 and 320. Also (e.g., to enhance clarity) the switching frequency and multiples of switching frequency components generated by the switching device (e.g., 270) and the active shunt path (e.g., 250) are not shown in the waveforms 310 and 320.

The $i_{in}$ waveform 320 is shown as an approximation of a square wave of current transitions having a 50 percent duty cycle, a frequency of 1 kHz and rising and falling edges of 10 microseconds. An actual slew rate can depend (at least in part) on the dimming signal waveform and the switch controller (e.g., 160).

The $i_{in1}$ waveform 310 is a trapezoidal wave (e.g., ideal trapezoidal wave) of a current having a 50-percent duty cycle, a frequency of 1 kHz and rising and falling edges having slew rates that are less than the respective slew rates of the $i_{in}$ waveform 320. The $i_{in1}$ waveform 310 is a trapezoid wave generally having an appearance as being superimposed over the $i_{in}$ waveform 320. The sloped (e.g., non-vertical) rising and falling edges of the $i_{in1}$ waveform 310 help inhibit the AEF (e.g., 220) from being in a saturated state and introducing broadband EMI noise into a system via power supply conduits.

Figure 4:
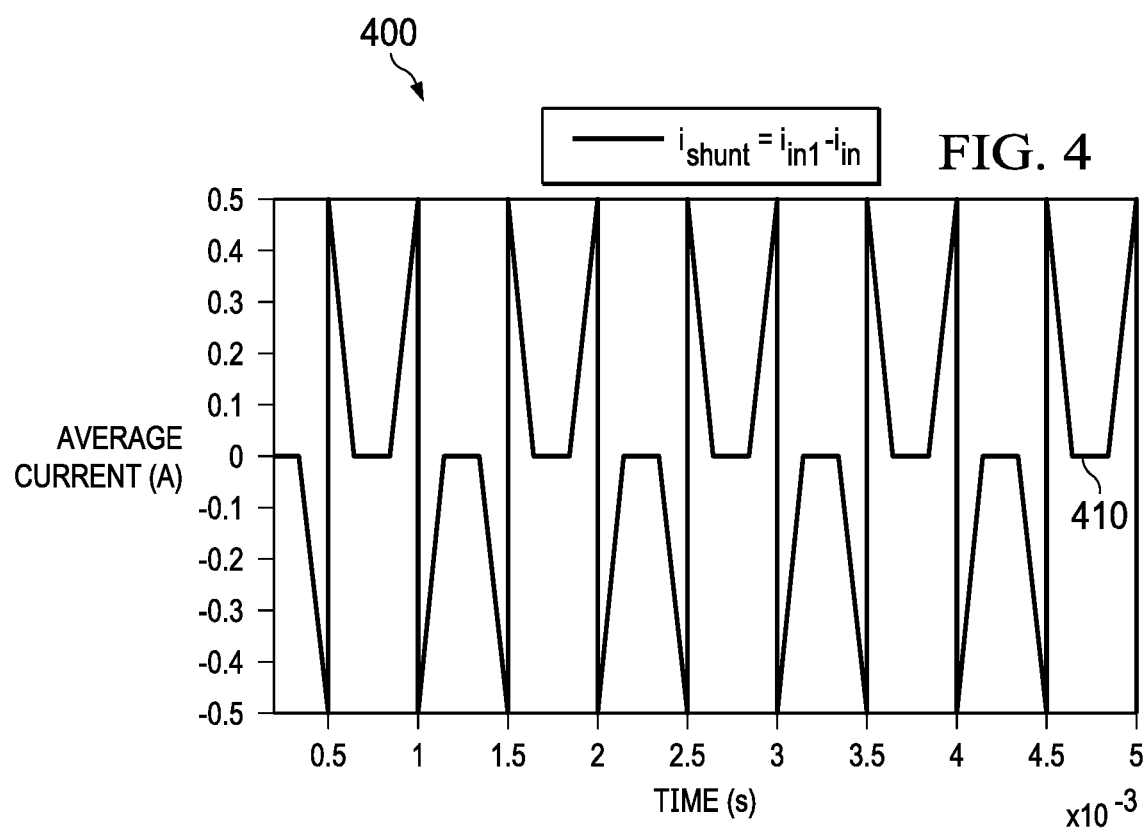
FIG. 4 is a waveform diagram of an example active shunt path current waveform of an LED PWM dimmer.

FIG. 4 is a waveform diagram of an example shunt current waveform. The waveform diagram 400 is an example waveform diagram that includes the $i_{shunt}$ waveform 410 (e.g., of an ideal current supplied by the active shunt 250). In accordance with the relationship $i_{shunt}=i_{in1}-i_{in}$, the $i_{shunt}$ waveform 410 is a waveform that (for example) results from (e.g., is generated by) the subtraction of the $i_{in}$ waveform 320 from the $i_{in1}$ waveform 310 of FIG. 3. Without the shunt current $i_{shunt}$, the high slew rate of the $i_{in}$ waveform 320 (for example) can otherwise drive the AEF (e.g., 220) into saturation (e.g., saturation can occur in an example where $i_{in}$ is directly coupled to the reactive network 240 and generates a large $V_{AEF}$ at the input power line 212 sensed by the AEF 220). By Kirchhoff's current law, the current $i_{in1}$ is equal to the sum of the shunt current $i_{shunt}$ and the current $i_{in}$. The waveform 410 of FIG. 4 also (e.g., in addition to 310 and 320) does not include the switching frequency and multiples of switching frequency components generated by the switching device (e.g., 270) and the active shunt path (e.g., 250).

Figure 5:
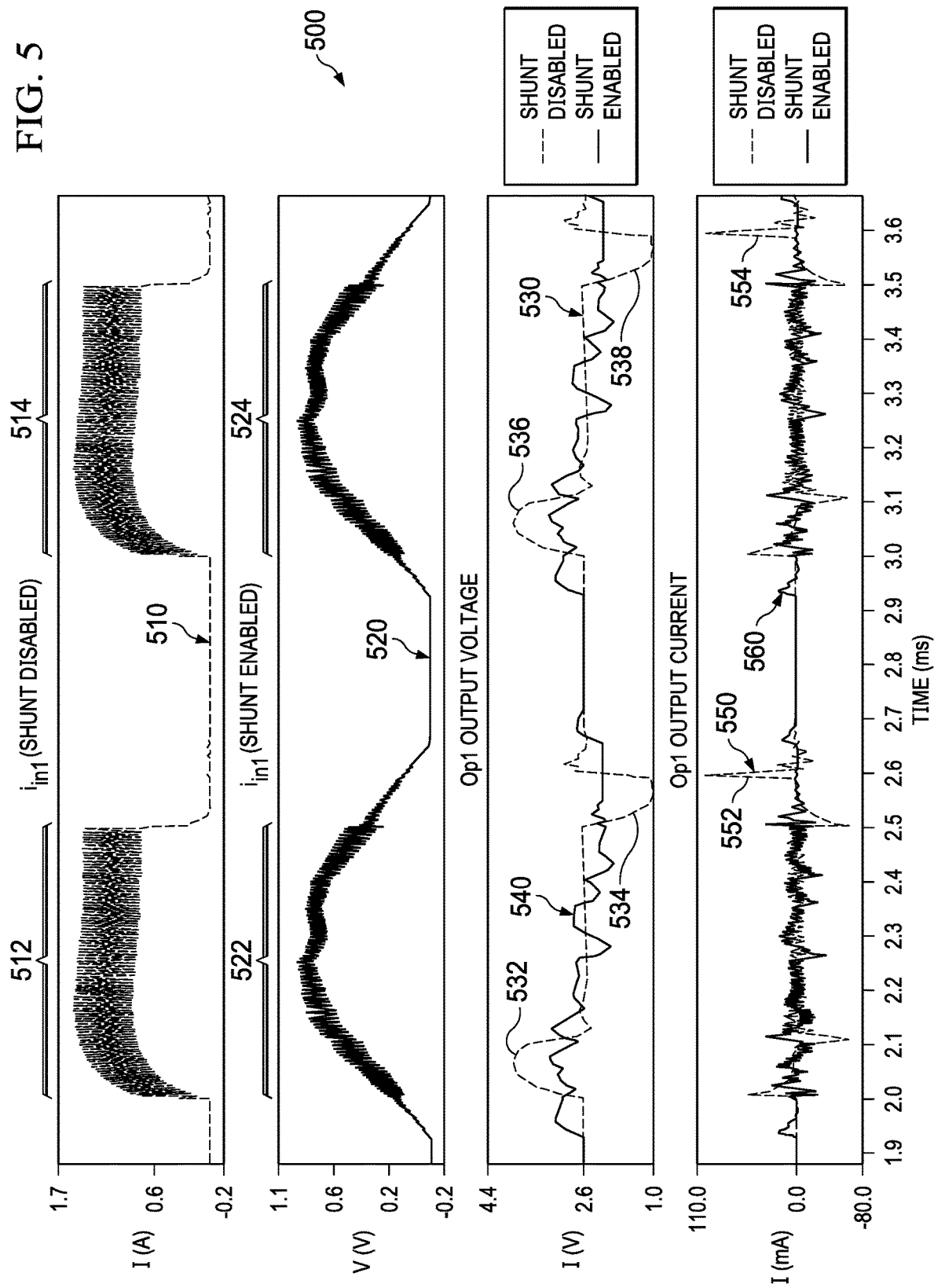
FIG. 5 is a waveform diagram of example time-domain waveforms for comparing an active EMI filter operating in conjunction with an enabled active shunt circuit against an active EMI filter operating having a disabled active shunt circuit.

FIG. 5 is a waveform diagram of example open-loop, time-domain simulated waveforms for comparing an active EMI filter operating in conjunction with an enabled shunt circuit against an active EMI filter operating having a disabled shunt circuit. The waveform diagram 500 is an example waveform diagram of a simulation output that includes the $i_{in1}$ (shunt disabled) waveform 510, the $i_{in1}$ (shunt enabled) waveform 520, the Op1 (shunt disabled) output voltage 530 (e.g., of the AEF 220), the Op1 (shunt enabled) output voltage 540, the Op1 (shunt disabled) output current 550 and the Op1 (shunt enabled) output current 560.

The $i_{in1}$ (shunt disabled) waveform 510 includes active dimming periods 512 and 514 (e.g., in which each of the active periods has a duty cycle of 50 percent and wherein each active period occurs when the dimming signal is high). During each of the active dimming periods 512 and 514, the transistors in the switching device (e.g. switching device 170 and/or PWM LED dimmer 270) switch on and off to power the load (e.g. the load 180, the LEDs 280) in response to the switching signal. Because of the high frequency switching, the $i_{in1}$ (e.g., which is the same current as $i_{in}$ when the shunt path is disabled) includes high frequency components during the active periods 512 and 514, which can generate EMI noise. Without the shunt path (e.g., when the shunt path 250 is disabled), the relatively fast rising and falling edges of the transitions into or out of the active periods (e.g., which can occur in response to the dimming signal) can saturate the AEF 220, so that the AEF 220 cannot attenuate the high frequency switching EMI noise as effectively.

The $i_{in1}$ (shunt enabled) waveform 520—as illustrated herein—has been low-pass filtered (e.g., to reduce the high frequency components thereof), so that the low frequency $i_{in1}$ slew rate reduction accomplished by the active shunt 250 (e.g., during simulation) can be more clearly seen (e.g., for clarity) in FIG. 5. The $i_{in1}$ (shunt enabled) waveform 520 includes active dimming periods 522 and 524 (e.g., in which each of the active dimming periods have a duty cycle of 50 percent). The active dimming period portion of the $i_{in1}$ (shunt enabled) waveform 520 as illustrated extends from a middle portion of the rising edge of the $i_{in1}$ (shunt enabled) waveform 520 to a middle portion of the falling edge of the $i_{in1}$ (shunt enabled) waveform 520. The low pass filtering applied to the illustrated-herein $i_{in1}$ (shunt enabled) waveform 520 reduces the high frequency switching components generated by the shunt path (e.g. active shunt 150 and/or active shunt 250) and by the switching device (e.g. switching device 170 and/or, PWM LED dimmer 270). As described hereinbelow, the reduction in slope of a rising edge (and/or a falling edge) of the $i_{in1}$ (shunt enabled) due to dimming reduces the probability that the operational amplifier (e.g., Op1 of the AEF 220) can enter a saturation state.

The Op1 (shunt disabled) output voltage 530 includes excursions 532, 534, 536 and 538, which occur at a rising or falling edges of the $i_{in1}$ (shunt disabled) waveform 510. For example, each of the excursions 532, 534, 536 and 538 includes a high slew rate (e.g., a high dv/dt) that rapidly tails off as the amplifier Op1 enters a saturation state. The excursions 532, 534, 536 and 538 indicate that Op1 operates in a voltage saturation mode (e.g., that the output voltage of Op1 is too high or too low to ensure the proper operation of Op1). The Op1 (shunt enabled) output voltage 540 (e.g., as shown) does not include such excursions because (for example) of the reduced slew rates of the expanded rise and fall times of the $i_{in1}$ (shunt enabled) waveform 520 (as illustrated with low pass filtering).

The Op1 (shunt disabled) output current 550 includes large peaks (e.g., peak 552 and peak 554) that are generated in response to a rising or falling edge of a respective excursion (e.g., 534 and 538). The current peaks 552 and 554 indicate, for example, that Op1 is operating in a current saturation mode (e.g., in which Op1 does not have enough drain or source current capability for proper operation). The Op1 (shunt enabled) output current 560 does not include such peaks because (for example) of the reduced slew rates of the $i_{in1}$ (shunt enabled) waveform 520 (as illustrated with low pass filtering).

Figure 6:
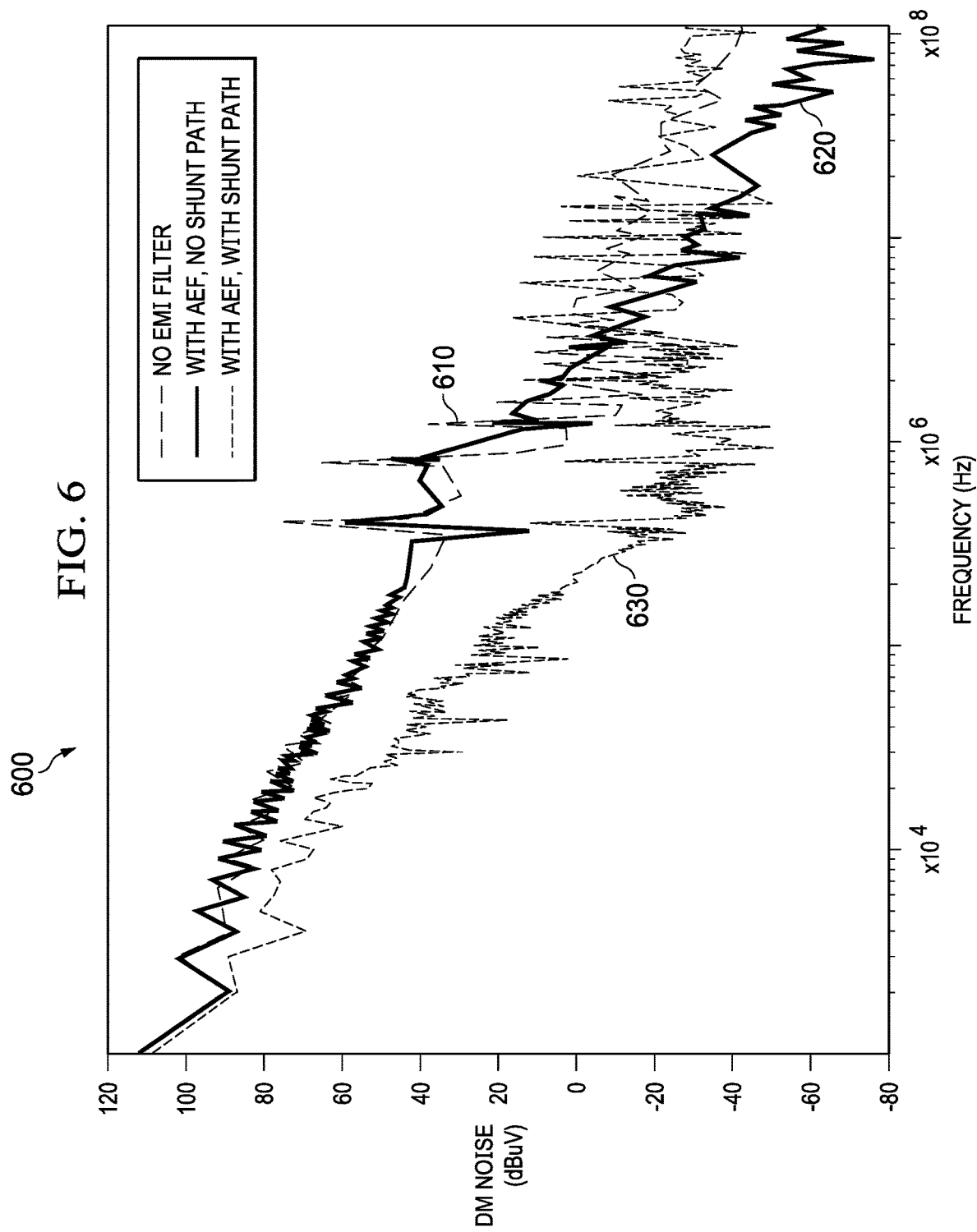
FIG. 6 is a spectral plot of example spectrums of noise generated by switching devices having no EMI filtering, having active EMI filtering with no shunt currents and having active EMI filtering with actively generated shunt currents.

FIG. 6 is a spectral plot of example noise spectra respectively generated by switching devices having no EMI filtering, having active EMI filtering with no shunt currents and having active EMI filtering with actively generated shunt currents. The spectrum diagram 600 is an example spectrum diagram that includes: the no-EMI filtering noise spectrum 610; the with-active-EMI-filtering and no-shunt-current spectrum 620; and the with active-EMI-filtering and with shunt-current spectrum 630. In the example illustrated by FIG. 6, the switching frequency of the switching device (e.g., switching device 170 and/or PWM LED dimmer 270) is 400 kHz, and the switching frequency of the active shunt (e.g. active shunt 150 and/or active shunt 250) is 2 MHz.

In the spectrum diagram 600, higher noise levels (e.g., generated by a dimmer-type switching device 170) are shown as having higher amplitudes along the y-axis. For at least some dimming systems, limits for permissible emission of EMI within a frequency range can exist. In an example system, EMI noise within an EMI concerned frequency range that extends, for example, from 150 kHz to 108 MHz.

Over a frequency range extending along the x-axis of the spectrum diagram 600 (e.g., between 150 kHz to 2 MHz): the no-EMI filtering noise spectrum 610 generally includes the greatest amount of noise; the with-active-EMI-filtering and no-shunt-current spectrum 620 generally includes a lesser amount of noise; and the with-active-EMI filtering and with shunt-current spectrum 630 generally includes the least amount of noise.

At an example frequency of a 400 kHz (e.g., at which a switching noise spike occurs): the EMI noise of spectrum 610 (having no AEF and no shunt current) is about 75 dBuV (decibel-microvolts), the EMI noise of spectrum 620 (AEF with no shunt current) is about 60 dBuV, and the EMI noise of spectrum 630 (AEF with shunt current) is about 12 dBuV. When noise at the switching frequency of 400 kHz is converted from the dBuV logarithmic scale to absolute units (e.g., volts), the EMI noise generated by a system having an active EMI filter and no shunt current is more than 200 times higher than the EMI noise generated by the system described herein having the active EMI filter and the active shunt (e.g., which indicates the performance of the AEF can be substantially improved by the active shunt described herein).

The size of an EMI filter is influenced by the frequency range to be filtered by the EMI filter. Generally, the lower the frequencies to be filtered (e.g., low-pass filtered), the larger the components of the so-adapted EMI filter are. When the switching frequency is a relatively low frequency such as 400 kHz, the size of the components of the passive components (e.g. inductors and/or capacitors) adapted to filter 400 kHz are relatively large, which tends to increase the size, volume, weight and cost of the EMI filter. The active shunt (e.g., 250) described herein increases the noise reduction of the active EMI filter at the switching frequency (e.g., which has a local maximum around the 400 kHz component in the spectrum diagram 600), so that, for example, the size, volume, weight and cost of the EMI filter can be correspondingly reduced. Moreover, including smaller size components of the EMI filter increases system power density, which can increase the range of target usages for such active EMI filtering.

At frequencies above 2 MHz in spectrum 630, the active shunt switching generates additional EMI noise, so, for example, the EMI noise with the-active-EMI filtering and with shunt-current can be larger than the above-2 MHz noise of systems that do not include the active shunt (e.g., 250). However, the resulting above-2 MHz noise of spectrum 630 (which includes active-EMI filtering and active shunt) does not exceed a substantially low maximum noise ceiling. For example, a substantially low maximum noise ceiling above 2 MHz can be 20 dBuV (decibel-microvolts), which is sufficiently low so as to not perceptually affect other systems connecting to the same power source (e.g. DC source 110) and which is lower than relevant standards. Accordingly, a power system (e.g., power system 100 and/or 200, which each include, for example, a compensated active EMI filter and an active shunt) described herein can synergistically improve the noise-reduction performance of the power system at lower costs, lower sizes and increased power densities.

Modifications are possible in the described embodiments, and other embodiments are possible, within the scope of the claims.

What is claimed is:

1. A circuit comprising:
    a switching controller having first, second and third controller outputs, wherein the switching controller is configured to provide a control signal at the first controller output that includes an output power signal having a first frequency, and a duty cycle signal having a second frequency, the first frequency being higher than the second frequency;
    a switching device having first, second and third switching inputs and a switching an output, the first switching input coupled to a direct current (DC) terminal, the second switching input coupled to the first controller output, the third switching input coupled to a reference terminal, and the switching device configured to provide controlled output power at the switching output responsive to the control signal at the second switching input; and
    a shunt circuit including:
        a first transistor coupled between a shunt terminal and the DC terminal and having a first gate, wherein the first gate is coupled to the second controller output; and
        a second transistor coupled between the shunt terminal and the reference terminal and having a second gate, wherein the second gate is coupled to the third controller output;
    wherein the switching controller is configured to provide signals at the second and third controller outputs that switch the shunt circuit synchronously with the duty cycle signal.

2. The circuit of claim 1, wherein the shunt circuit includes a shunt inductor coupled between the shunt terminal and the first and second transistors.

3. The circuit of claim 2, wherein the first transistor is configured to selectively couple the shunt inductor to the DC terminal, and the second transistor is configured to selectively couple the shunt inductor to the reference terminal.

4. The circuit of claim 3, wherein the shunt circuit includes a shunt capacitor coupled between the shunt terminal and the reference terminal.

5. The circuit of claim 4, wherein the first transistor, the second transistor and the shunt inductor are configured to operate:
    as a buck converter responsive to a positive current through the first transistor; and
    as a boost converter responsive to a negative current through the first transistor.

6. The circuit of claim 4, wherein the shunt circuit includes a first diode and a second diode, the first diode coupled across the first transistor and configured to conduct a first freewheeling current responsive to a negative current through the first transistor, and the second diode coupled across the second transistor and configured to conduct a second freewheeling current responsive to a positive current through the first transistor.

7. The circuit of claim 4, wherein the second controller output is a logical complement of the third controller output.

8. The circuit of claim 1, further comprising an active electromagnetic interference filter (AEF) coupled to the DC terminal, the AEF configured to filter noise from the switching device.

9. The circuit of claim 8, further comprising a reactive network coupled between the AEF and the first transistor.

10. The circuit of claim 9, wherein the shunt circuit is configured to selectively provide a shunt current to the DC terminal.

11. The circuit of claim 1, wherein the shunt circuit is configured to selectively enable the first transistor responsive to the duty cycle signal.

12. A system comprising:
    an active electromagnetic interference filter (AEF) coupled to a direct current (DC) terminal;
    a switching device having a switching output and first and second switching inputs, wherein the switching device is configured to selectively conduct a first current at the first switching input;
    an inductor coupled between the AEF and the first switching input, the inductor configured to conduct a second current;
    a capacitor coupled between a ground terminal and the first switching input, the capacitor configured to conduct a third current;
    a switching controller having a first controller output and a second controller output, the second controller output coupled to the second switching input, the switching controller configured to provide a first controller signal at the first controller output, and a second controller signal at the second controller output, the second controller signal including an output power signal having a first frequency, and a duty cycle signal having a second frequency, wherein the first frequency is higher than the second frequency; and
    a shunt circuit having a shunt current input and a shunt control input, the shunt current input coupled to the first switching input, the shunt control input coupled to the first controller output, and the shunt circuit configured to selectively conduct a fourth current from the shunt current input responsive to the first controller signal, in which a sum of the first and fourth currents is equal to a sum of the second and third currents, the shunt circuit including:
        a first transistor coupled between a shunt terminal and the DC terminal and having a first gate, wherein the first gate is coupled to the switching controller; and
        a second transistor coupled between the shunt terminal and the ground terminal and having a second gate, wherein the second gate is coupled to the switching controller;
    wherein the switching controller is configured to provide a signal at the first controller output to switch the shunt circuit synchronously with the duty cycle signal.

13. The system of claim 12, further comprising a load coupled to the switching output.

14. The system of claim 12, wherein the shunt circuit is configured to selectively provide a shunt current to the DC terminal.

15. A method, comprising:
  generating, by a switching device having a first input coupled to a direct current (DC) terminal, a modulated output power at an output of the switching device by switching the switching device to selectively conduct a first current from the first input, responsive to a switching control signal;
  filtering, by an active electronic filter (AEF) coupled to the DC terminal, noise generated by switching of the switching device;
  selectively coupling, by an active shunt, a shunt current to the first input of the switching device responsive to a shunt control signal, the active shunt including a first transistor coupled between a shunt terminal and the DC terminal, the first transistor having a first gate responsive to the shunt control signal, and a second transistor coupled between the shunt terminal and a ground terminal, the second transistor having a second gate responsive to the shunt control signal;
  generating, by a switching controller, the switching control signal including a high frequency signal adapted to control the modulated output power of the switching device, and a low frequency signal adapted to control the percentage that the modulated output power is on; and
  generating, by the switching controller, the shunt control signal such that the active shunt is switched synchronously with the low frequency signal to selectively couple the shunt current to the first input to thereby reduce a slew rate of a current through a reactive network that is coupled between the first input of the switching device and a power source of the switching device.

16. The method of claim 15, further comprising generating, by the switch controller, the high frequency signal and the low frequency signal by pulse width modulation, the shunt control signal responsive to the low frequency signal.

* * * * *